United States Patent
Futamoto et al.

(10) Patent No.: US 6,183,893 B1
(45) Date of Patent: Feb. 6, 2001

(54) PERPENDICULAR MAGNETIC RECORDING MEDIUM AND MAGNETIC STORAGE APPARATUS USING THE SAME

(75) Inventors: Masaaki Futamoto, Tsukui-gun; Yoshiyuki Hirayama, Kodaira; Kenya Ito, Hachioji; Kazuetsu Yoshida, Hidaka; Yukio Honda, Fuchu; Nobuyuki Inaba, Hasuda, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/285,751

(22) Filed: Apr. 5, 1999

(30) Foreign Application Priority Data

Apr. 19, 1998 (JP) .................................................. 10-093334
Jun. 15, 1998 (JP) .................................................. 10-167089

(51) Int. Cl.[7] ........................................................ B32B 15/00
(52) U.S. Cl. .................... 428/694 TS; 360/81; 427/131; 427/132; 428/336; 428/668; 428/670; 428/694 TM; 428/900; 428/928
(58) Field of Search ........................ 428/694 TS, 694 TM, 428/900, 928, 336, 670, 668; 360/81; 427/131, 132

(56) References Cited

FOREIGN PATENT DOCUMENTS

| | | |
|---|---|---|
| 57-109127 | 7/1982 | (JP) . |
| 58-77025 | 5/1983 | (JP) . |
| 58-14135 | 8/1983 | (JP) . |
| 60-64413 | 4/1985 | (JP) . |
| 60-214417 | 10/1985 | (JP) . |

OTHER PUBLICATIONS

41st Annual Conference on Magnetism and Magnetic Materials, Nov. 1996, Abstracts, DQ–13, p. 116.
41st Annual Conference on Magnetism and Magnetic Materials, Nov. 1996, Abstracts EB–12, pp. 133–134.
The 5th Perpendicular Magnetic Recording Symposium PMRS '96, Oct. 1996, pp. 95–100.
IEEE Transactions, MAG–24, No. 6, 1988, pp. 2706–2708. (no month avail.).

*Primary Examiner*—Bernard Pianalto
(74) *Attorney, Agent, or Firm*—Mattingly, Stanger & Malur, P.C.

(57) ABSTRACT

The present invention relates to a perpendicular magnetic recording medium and a magnetic storage apparatus which are improved to be suitable for high-density magnetic recording. An object thereof is to provide the perpendicular magnetic recording medium and the magnetic storage apparatus which have a low noise property for realizing a recording density of 10 Gb/in.$^2$ or more and a high stability against thermal fluctuation.

The perpendicular magnetic recording medium comprising a perpendicular magnetic film formed through an underlayer on a nonmagnetic substrate, wherein the underlayer comprises a material having a hexagonal close packed structure or an amorphous structure, and has a first underlayer nearer to the substrate, and a second underlayer having a hexagonal close packed structure formed on the first underlayer and a preferred growth orientation of [0001] and comprising a material capable of hetero-epitaxy growth onto the perpendicular magnetic film.

22 Claims, 5 Drawing Sheets

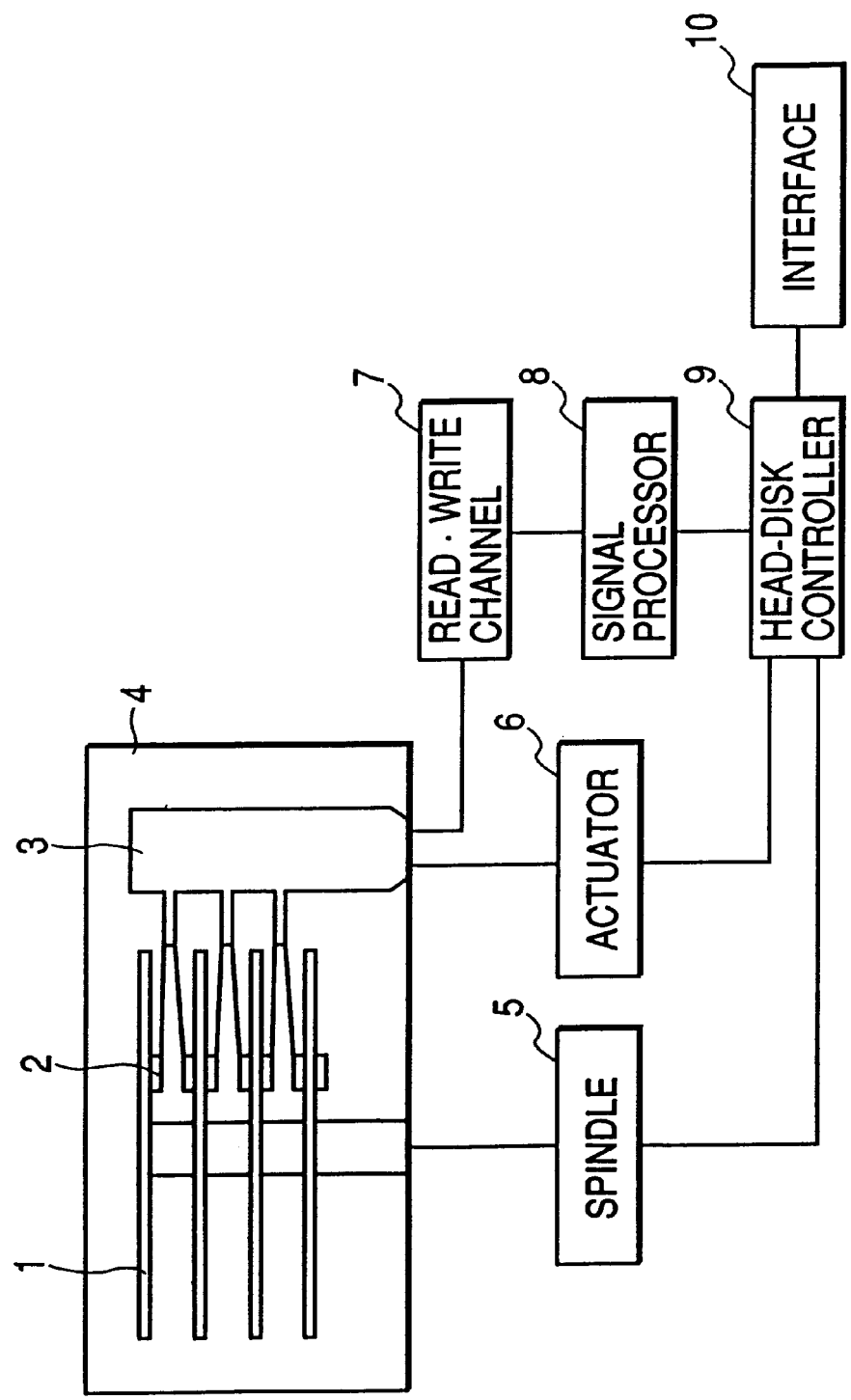

PERPENDICULAR MAGNETIC RECORDING MEDIUM AND MAGNETIC STORAGE APPARATUS USING THE SAME

BACKGROUND OF THE INVENTION

1. Field of the Invention

The present invention relates to a perpendicular magnetic recording medium having a perpendicular magnetic film suitable for high-density magnetic recording, and a magnetic storage apparatus using the same.

2. Description of the Prior Art

In magnetic disk apparatuses that have been made practicable at present, longitudinal magnetic recording is commercialized. In the longitudinal magnetic recording, a technical objective is to form, in a longitudinal magnetic recording medium which is liable to be magnetized in the direction parallel to its disk substrate surface, longitudinal magnetic domains that are parallel to the substrate at high densities. As a method to increase the recording density of this longitudinal magnetic recording medium, there is proposed a method of using keepered media in which a very thin, soot magnetic film is formed on the surface of a recording medium having an axis of easy magnetization in the longitudinal direction.

This technique is described on page 116 (Article No. DQ-13) and page 133 (Article No. EB-12) of collected abstracts published in 41st Annual Conference of Magnetism &Magnetic Materials (Nov. 12–15, 1996), and the like.

It is stated that according to adoption of such a medium structure it is possible to use an inductive type of thin film head for recording and reading so as to improve the areal recording density of magnetic recording greater than 1 $Gb/in.^2$ In the case of the longitudinal recording system, however, the magnetization directions of adjacent recorded bits are essentially opposite to each other. Thus, even if such a technique is used, magnetization transition areas whose boundary has a certain width are formed, so that it is technically not easy to realize an areal recording density of 10 $Gb/in.^2$ or more.

On the other hand, the perpendicular magnetic recording is a method to form magnetization perpendicular to the thin film media surface, and is different from conventional longitudinal recording media in recording principles and the mechanisms of medium noises. Since adjacent magnetization directions are not opposite to each other, the perpendicular magnetic recording has attracted attention as a method suitable for high-density magnetic recording. Various structures of perpendicular media are proposed to improve the performance of magnetic recording.

In order to improve perpendicular orientation of a perpendicular magnetic film composed of, for example, Co alloy materials, investigations have been made on methods of forming an underlayer between the perpendicular magnetic film and a substrate. For example, Japanese Unexamined Patent Publication Nos. 58-77025 and 58-141435 disclose methods of forming a Ti film as an underlayer of a Co—Cr magnetic film. Japanese Unexamined Patent Publication No. 60-214417 discloses a method of using a Ge or Si material as an underlayer, and Japanese Unexamined Patent Publication No. 60-064413 discloses underlayer materials of oxides such as CoO and NiO.

Moreover, as a perpendicular magnetic recording medium which is combined with a single pole type recording head for use, investigations have been made on a medium having a soft magnetic thin film such as permalloy between its substrate and its perpendicular magnetic film.

SUMMARY OF THE INVENTION

For a perpendicular magnetic recording medium capable of high-density recording at a level of 10 $Gb/in.^2$ or more, it is necessary that its linear recording density resolution is large and further medium noises are small.

Reports up to the present state that it is effective to make the thickness of a perpendicular magnetic film small, to introduce a nonmagnetic CoCr underlayer between a perpendicular magnetic film and a substrate, to add a nonmagnetic element such as Ta as an additive element to a Co alloy magnetic film, or to make the grain size of magnetic crystals smaller, as described in the article titled "High S/N single-layered perpendicular magnetic recording disks" on pp. 95–100 of collected conference materials of 5th Perpendicular Magnetic Recording Symposium (Oct. 23–25, 1996).

Such countermeasures make it possible to reduce medium noises considerably. If the noises cain be further reduced, it is possible to increase the recording density of magnetic recording apparatuses with ease.

In consideration of such situations of perpendicular magnetic recording, a first object of the present invention is to provide a perpendicular magnetic recording medium having a low noise property for implementing a high recording density of 10 $Gb/in.^2$ or more, and a high-density magnetic storage apparatus using the medium.

As described in Japanese Unexamined Patent Publication No. 57-109127, the Journal of the Japan Applied Magnetism Society Vol. 8, No. 2, pp. 57–60 (1984), or IEEE Trans., MAG-24, No. 6, pp. 2706–2708 (1988), a Co—Cr based alloy films are used as a perpendicular magnetic recording medium, and it appears preferable to segregate nonmagnetic Cr atoms in the grain boundary of fine grains constituting the medium. This is because areas having a high Cr concentration are formed in the surface of the grains to improve corrosion resistance, and further nonmagnetic Cr atoms are segregated in the grain boundary in the same manner as in the longitudinal recording media so that magnetic exchange interaction between the grains is broken off, whereby magnetic domains are made finer to reduce medium noises.

In the combination of a ring type head and a single layer perpendicular magnetic medium, however, even if the medium is manufactured under conditions for promoting segregation of Cr atoms, the resultant medium is not necessarily strong against thermal fluctuation. This does not bring out advantages of perpendicular magnetic recording.

Therefore, a second object of the present invention is to provide a magnetic recording medium having stability against thermal fluctuation, and a high-density magnetic recording apparatus using the same. (1) First, the following inventions will be described: a perpendicular magnetic recording medium having a low noise property for realizing a high recording density, which can attain the first object of the present invention, and a high-density magnetic recording apparatus using the same.

Examination of recorded magnetization of perpendicular magnetic recording media with a magnetic force microscope and a spin polarized scanning electron microscope has proved that most of noises are caused by reversed domains, which are present in the surface of the media and will be described in detail later, and microscopic fluctuation of magnetization.

The microscopic fluctuation of magnetization means that the intensity of the local magnetization fluctuates at intervals of about 0.2–10 $\mu m$ from area to area on the medium surface. In order to reduce medium noises, it is essential not only to reduce the reversed domains but also to reduce the microscopic fluctuation of magnetization present in the surface of the media.

From the results of experiments by the inventors et al., it has been made clear that the object can be attained by the following method.

That is, when a perpendicular magnetic film is magnetized perpendicularly to the film plane and in a single direction, an intense demagnetizing field acts on the medium surface. Under the influence of this demagnetizing field, there are formed so-called reversed domains, which are along the direction reverse to the perpendicular magnetization direction. In order to prohibit the forming of these reversed domains, it is necessary to adopt a perpendicular magnetic film having a large magnetic anisotropic energy.

It is desired that the magnetic anisotropic energy is $2.5 \times 10^6$ erg/cc or more. The maximum value of the magnetic anisotropic energy of a perpendicular magnetic film using a Co-alloy material, which can easily be handled as a practical medium, is $5 \times 10^6$ erg/cc. There exist Co-alloy materials with ordered lattice structure which have a larger magnetic anisotropic energy than the value. However, a process temperature of 500° C. or higher becomes necessary for obtaining an ordered phase, so that the following problems arise: the scope from which a substrate material is selected gets narrow, or crystal grains constituting the magnetic film grow coarse so that it becomes difficult to reduce noises.

In perpendicular magnetic films made of a multilayer film of materials other than Co-alloys, such as Pt/Co or Pd/Co, or perpendicular magnetic films having an amorphous structure containing rare-earth elements such as TbFeCo, all of their magnetic anisotropic energies are $2.5 \times 10^6$ erg/cc or more. Thus, they can be used as materials for attaining the object of the present invention. However, since they themselves have an intense in-plane magnetic interaction so that medium noises become large, any solutions are required for them to reduce the medium noises.

In order to make the areal density of magnetic recording to a value of 10 Gb/in.$^2$ or more, it is necessary that its liner recording density is 300 kFCI (Flux Change per Inch) or more. The bit length corresponding to this linear recording density is 83 nm. Considering the recording capability of a ring type head, it is desired a that the thickness of the magnetic recording medium taking charge in recording is smaller than the shortest bit length. It is necessary to set the thickness of the perpendicular magnetic film to 70 nm or less. If the thickness is 5 nm or less, recording magnetization is made unstable because of thermal fluctuation. As a result, the thickness of the perpendicular magnetic film suitably ranges from 5 to 70 nm.

The intensity of the reversed domains, which cause noises, depends on the grain size of the polycrystal film constituting a perpendicular magnetic recording medium and the strength of magnetic interaction between the crystal grains. To make the size of the reversed domains to not more than a bit length of 300 kFCI, it has been proved that the average of the crystal grain size needs to be 15 nm or less. However, if the crystal grain size becomes too small, the coercive force of the medium decreases so that the medium becomes unsuitable for a recording medium. It is therefore desired that the grain size is 5 nm or more. The average of the crystal grain size, referred to in the present invention, means the average of circles having an area equivalent to the area of crystal grains observed on the surface of a magnetic recording medium.

By using a perpendicular magnetic film having a high magnetic anisotropic energy, since the generation of reversed domains can be prohibited, it is possible to reduce the medium noises resulting from the formation of reversed domains. As other cause of the medium noises, however, there is known microscopic fluctuation of the magnetization present in the surface of the medium. In a case there exists a considerable in-plane magnetic interaction across the magnetic film, a long range magnetization fluctuation arises. In a case where the surface of the perpendicular magnetic film has magnetic inhomogenity, a short range magnetization fluctuation arises. It has been proved that both the fluctuations cause medium noises and that, in order to suppress such long and short range fluctuations of the magnetization, it is necessary to make the perpendicular magnetic film to be consisting of a bilayer structure, and adopt as the upper layer a perpendicular magnetic layer having a large magnetic anisotropic energy (Ku) and as the lower layer a perpendicular magnetic layer having both of a small magnetic anisotropic energy and promoted magnetic isolation between crystal grains.

It is effective that the upper perpendicular magnetic layer satisfies: $2.5 \times 10^6$ erg/cc $\leq$ Ku $\leq 5 \times 10^6$ erg, and the lower perpendicular magnetic layer satisfies: $1 \times 10^6$ erg/cc $\leq$ Ku $\leq 2.5 \times 10^6$ erg.

The lower perpendicular magnetic layer functions to make the pitch of the microscopic fluctuation of the magnetization finer than the bit length that is used for recording, and the upper perpendicular magnetic layer functions to suppress the forming of reversed domains. Concerning the ratio of the thickness of both the films, the thickness of the lower layer is desirably larger than that of the upper layer to suppress noises produced from the whole of the layers, and the former is preferably two or more times as large as the latter. It is not desirable that the former is less than two times as large as the latter, because the lower layer does not sufficiently attain the function for making the pitch of the microscopic fluctuation of the magnetization finer than the bit length that is used for recording.

Concerning the lower perpendicular magnetic layer, it is desired that the average of its crystal grain sizes is from 5 to 15 nm and that, for reducing the magnetic interaction between its crystal grains nonmagnetic elements are precipitated in an amount of 25 atomic % or more, or voids are formed, in the crystal grain boundary. When the total amount of the nonmagnetic additive elements contained in the Co-alloy constituting the perpendicular magnetic film is not less than 25 atomic % and practically not more than 50%, the saturation magnetization Ms of the material decreases extremely. In case of some additive elements, the film changes to non-magnetic. It is undesireble that the total amount of the nonmagnetic additive element is over 50%, because it becomes difficult to keep the hexagonal close packed structure of Co. If such a low saturation magnetization layer or a nonmagnetic layer is present, the magnetic exchange interaction between the magnetic crystal grains is lowered to produce a desirable effect of the reduction in medium noises.

In order that the magnetic recording film has an intense perpendicular magnetic anisotropy, it is necessary that crystal lattices of the upper and lower perpendicular magnetic layers are continuous, that is, it is necessary to maintain hetero-epitaxy relationship.

In order to reduce medium noises, it is also effective, adding to the reduction of magnetic interact-on between the magnetic crystal grains, to magnetically isolate and/or to reduce the magnetic interaction of the crystal grains in the thickness direction of the perpendicular magnetic film. For this purpose, it is effective to introduce, between the two upper and lower perpendicular magnetic layers, an interlayer with non-magnetic property, or with weak magnetization of which saturation magnetization Ms is 50 emu/cc or less.

The thickness of the interlayer suitably ranges from 0.1 to 5 nm. If the thickness of the interlayer is less than 0.1 nm, an effect based on the introduction of the interlayer cannot be sufficiently obtained. If it is over 5 nm, the coercive force of the whole of the medium is unfavorably lowered. Suitable materials of the interlayer are a simple metal such as Pt, Pd, Ir, Re, Ru or Hf; alloys made mainly of such a metal element; and materials wherein the metal or other nonmagnetic element is added in an amount of 25 atomic % or mores to Co.

Through thermal activation, the reversed domains formed in the surface of the perpendicular magnetic film increase caused by demagnetization field as time passes. Results of the inventors' experiments have made it evident that in order to suppress the forming of the reversed domains following the passage of time it is effective to form a thin metal film of which thickness ranging between 0.1 and 5 nm on the surface of the upper magnetic layer, or at the substrate side of the lower perpendicular magnetic layer, as well as on the upper film.

As this metal film, the following can be used: a simple metal selected from the element group consisting of Pt, Pd; Ir, Re, Ru and Hf; alloy films made mainly of any one(s) of these metal elements; laminated films of a Co film or a Co-alloy film, and a film of the metal or an alloy film made mainly of the metal element described above; an amorphous magnetic material film containing a rare-earth element; soft magnetic films such as permalloy, Fe—Si, Fe—Si—Al, and Co—Nb—Zr; or magnetic films which can easily be magnetized longitudinally, such as Co, Ni, Fe, Co—Ni, Co—Ni—Cr. Instead of forming the metal film, a light element such as C, B, N or P may be diffused or ion-implanted onto the surface of the perpendicular magnetic film, so that apart of the perpendicular magnetic film, which is at its surface side viewed in the thickness direction, may be changed into a soft magnetization film or a longitudinal magnetic film.

Summarizing the above, the present invention is as follows.

The perpendicular magnetic recording medium of the present invention comprises a perpendicular magnetic film formed through an underlayer on a nonmagnetic substrate, wherein the underlayer comprises a material having a hexagonal close packed structure or an amorphous structure. The underlayer has a first underlayer nearer to the substrate, and a second underlayer having a hexagonal close packed structure formed on the first underlayer and a preferred growth of [0001] and comprising a material capable of hetero-epitaxy growth to the perpendicular magnetic film which is subsequently formed on the second underlayer. The perpendicular magnetic film formed on the second underlayer includes a lower perpendicular magnetic layer contacting the second underlayer and an upper perpendicular magnetic layer formed thereon, the perpendicular magnetic film including the lower and upper layers is a Co-alloy polycrystal film, and the total concentration of added nonmagnetic elements in the upper perpendicular magnetic layer is lower than that in the lower perpendicular magnetic layer. The saturation magnetization Ms and the magnetic anisotropic energy Ku of the upper perpendicular magnetic layer are larger that those of the lower perpendicular magnetic layer, and continues hetero-epitaxy growth from the second underlayer to the upper perpendicular magnetic layer is realized. The total thickness of the perpendicular magnetic film is from 5 to 70 nm, and the average grain size of crystal grains in the upper perpendicular magnetic layer is from 5 to 15 nm on the basis of measurement at the surface side of the upper perpendicular magnetic layer.

Continuous hetero-epitaxy growth (growth of films with continuity of the crystal lattices) from the second underlayer to the upper perpendicular magnetic layer may be realized by disposing a nonmagnetic interlayer or an interlayer having a saturation magnetization Ms of 50 emu/cc or less between the lower perpendicular magnetic layer and the upper perpendicular magnetic layer. The interlayer has a thickness of 0.1–5 nm.

A metal film having a thickness of 0.1–5 nm may be deposited on the upper perpendicular magnetic layer. This metal film may be made of a film of a simple metal selected from the element group consisting of Pt, Pd, Ir, Re, Ru and Hf; an alloy film made mainly of any one(s) of these metal elements; laminated films of a Co film or a Co-alloy film, and a film of a simple metal selected from the element group consisting of Pt, Pd, Ir, Rg, Ru and Hf or an alloy film made mainly of any one(s) of these metal elements; or an amorphous magnetic material film containing a rare-earth element.

It is preferred that the lower perpendicular magnetic layer is a polycrystal layer containing, in its crystal grain boundary, a segregation phase of a nonmagnetic element in an amount of 25 atomic % or more and practically 50 atomic % or less. It is preferred that the magnetic anisotropic energy Ku of the lower perpendicular magnetic layer is not less than $1 \times 10^6$ erg/cc a and not more than $2.5 \times 10^6$ erg/cc, and the magnetic anisotropic energy Ku of the upper perpendicular magnetic layer is not less than $2.5 \times 10^6$ erg/cc and not more than $5 \times 10^6$ erg/cc.

It is preferred that the difference between the lattice constants of the second underlayer and the lower perpendicular magnetic layer is 5% or less, and the thickness of the lower perpendicular magnetic layer is 2 or more times as large as that of the upper perpendicular magnetic layer. In a case where the structure is used and additionally a magnetic film such as a soft magnetic layer or an in-plane magnetic film is inserted between the underlayer and the substrate, likewise the advantages of the present invention can be obtained.

The perpendicular magnetic recording medium of the present invention is applied to magnetic recording apparatuses so as to exhibit a high performance.

Namely, a magnetic storage apparatus of the present invention comprises a magnetic recording medium, a spindle motor for rotating the magnetic recording medium, a magnetic head having a recording element and a reading element, an actuator for positioning the magnetic head, and a means for signal processing or reading signals of the magnetic head. The perpendicular magnetic recording medium is used as the magnetic recording medium, and a magnetoresistive transducer or a giant megnetoresistive transducer is used as the reading element of the magnetic head, thereby performing magnetic recording or reading at an areal recording density of 10 Gb/in.$^2$ or more.

Furthermore, another magnetic storage apparatus of the present invention comprises a magnetic recording medium, a spindle motor for rotating the magnetic recording medium, a magnetic head having a recording element and a reading element, an actuator for driving the magnetic head, and a means for signal processing or reading signals of the magnetic head. The perpendicular magnetic recording medium of the present invention is used as the magnetic recording medium, and a magneto-resistance detection type head using magnetic tunneling effect is used as the reading element of the magnetic head, thereby performing magnetic recording or reading at an areal recording density of 30 Gb/in.$^2$ or more.

According to the present invention, noises of the perpendicular magnetic recording medium can be reduced, so that a high S/N ratio can be obtained, resulting in implementing high-density magnetic disk devices. In particular, magnetic recording which can exhibit a high density of 10 Gb/in.$^2$ or more can be realized to easily make the devices compact and make their capacity larger. (2) The following will describe a magnetic recording medium having stability against thermal fluctuation, which can attain the second object of the present invention, and a high-density magnetic recording apparatus using the same.

From eager investigations on the relationship between magnetic read/write characteristics and the properties of a medium, the inventors have found that the stability against thermal fluctuation is closely related to the magnetic property of the topmost surface area of the recording layer, and then arrived the present invention.

In other words, in a magnetic film that is widely used in perpendicular magnetic recording, for example, a Co—Cr based alloy perpendicular magnetic film, the magnetic anisotropy of its topmost surface layer is smaller than that of the interior of the film. Consequently, seeds of reversed domains are first produced in the topmost surface and become nuclei, so that the reversed domains are conducted to the interior of the film. For this reason, the intensity of the magnetic field generated by the reversed domains decreases so that a thermally unstable structure is produced. In order to prevent this, it is effective to deposit a film having an large perpendicular magnetic anisotropy on the surface of the recording film. However, it is necessary to use a material having a far larger magnetic anisotropy constant than that of Co—Cr based alloys. Such a material is very restrictive among all materials and is, for example, Co—Pt based materials.

In the present invention, the object can be attained by forming, on both surfaces or one side surface of a perpendicular magnetic recording film, a magnetic film having such the property with longitudinal easy magnetization that the coercive force of the magnetization curve measured along the longitudinal direction is 100 Oe or more, and more preferably 500 Oe or more. Sm—Co based magnetic films or Fe—Nd—B based magnetic films, which have a large anisotropy constant and are not liable to be affected thermal fluctuation, are especially suitable for the magnetic films having such the property of longitudinal easy magnetization.

That is, in a recording medium used in perpendicular magnetic recording, a magnetic film having the property of longitudinal easy magnetization is formed on both surface or a single surface of a magnetic recording film having the property of easy perpendicular magnetization. This magnetic film having the property of longitudinal easy magnetization is a film for prohibiting the formation of reversed domains in the surface layer portion of the perpendicular magnetic recording film, and can be called a prohibitive layer to nucleate reverse domains.

The thickness of the magnetic film having the property of longitudinal easy magnetization is preferably 10 nm or less and more preferably about 1 nm. If the thickness is too large, components which are longitudinally recorded become large to damage the advantages of perpendicular magnetic recording.

Concerning the magnetic film having the property of longitudinal easy magnetization, the coercive force measured along the longitudinal direction is preferably 100 Oe or more and more preferably 500 Oe or more. Furthermore, it is desired that the upper limit thereof is 4,000 Oe or less in the light of recording capability of a recording head. If the coercive force is less than 100 Oe, magnetic walls are liable to be produced in the longitudinal magnetization film to cause noises.

Sm—Co based magnetic films or Fe—Nd—B based magnetic films are suitable for the magnetic film having the property of longitudinal easy magnetization. In the Sm—Co based magnetic films, a high coercive force can be obtained by setting its composition in such a manner that the Sm content is from 15 to 22 atomic %, and more preferably from 18 to 20 atomic %. Concerning the Fe—Nd—B based magnetic films, its composition is preferably a composition that Nd is from 10 to 35 atomic % and B is from 5 to 20 atomic %, and more preferably a composition that Nd is from 10 to 15 atomic 5 and B is from 5 to 10 atomic %.

According to the present invention, in a Co—Cr based film medium for perpendicular magnetic recording, stability against thermal fluctuation is improved by disposing a very thin film with longitudinal easy magnetization on the surface of the perpendicular magnetic recording film.

Furthermore, a high reproduced output and a low medium noise property can be obtained as a secondary effect to improve an S/N ratio. Moreover, the magnetic recording/reading apparatus using the perpendicular magnetic recording medium of the present invention has a high reproduced output and S/N ratio, and an excellent capability of storing recorded data for a longer time.

The following preferred examples and drawings for reference will make clear structural characteristics of the present invention and industrially availability.

BRIEF DESCRIPTION OF THE DRAWINGS

FIG. 7 is a block view which schematically illustrates an example of the magnetic recording/reading apparatus of the present invention, and which includes a partial cross section.

DETAILED DESCRIPTION OF THE PREFERRED EMBODIMENTS

Figure 1:
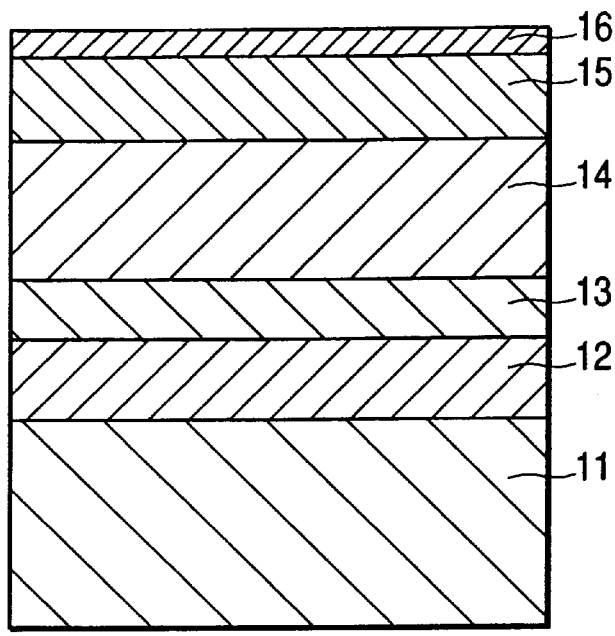
FIG. 1 is a schematic sectional view of main elements of a recording medium of an example according to the present invention.

Referring to the drawings, examples of the present invention will be specifically described hereinafter.

FIG. 1 is a schematic sectional view of a first example of the perpendicular magnetic recording medium according to the present invention. In this perpendicular magnetic recording medium, a perpendicular magnetic film is formed on a nonmagnetic substrate 11 through underlayers 12 and 13 for improving perpendicular orientation of the magnetic film and controlling its crystal grain sizes.

The first underlayer 12 formed at the side of substrate functions so as to control nucleation process of the film during thin film growth in a manner that the growth orientation of the second underlayer 13 having a hexagonal close packed structure becomes [0001] orientation. The following are suitable for the material of the first underlayer 12 fitting to this function: Ti or Ru; materials containing this element as a main element and Cr, V, Mo or W as an additive element and having a hexagonal close packed structure; amorous materials consisting of Si or Ge, or made mainly of this element.

The second underlayer 13 is made of a nonmagnetic material having a hexagonal close packed structure or a weak magnetic material having a hexagonal close packed structure and having a saturation magnetization Ms of 50 emu/cc or less. As this material, there is used a material wherein a nonmagnetic element such as Cr, V-Mo, W, Nb, Re, Ti or Y is added in an amount of 25 atomic % or more and practically 50 atomic % or less to Co. It is unfovarable that the intensity of the magnetization of this material is 50 emu/cc or more, because resolution at the time of recording or reading is lowered or noises are increased. This second underlayer and the perpendicular magnetic film 14 formed thereon keeps hetero-epitaxy relationship. In order to realize good hetero-epitaxy growth, it is necessary that the difference between the lattice constants of both the films be set to 5% or less. If the difference of the lattice constants is 5% or more, misfit dislocation is caused or strains are produced in the magnetic film so that the magnetic anisotropy is unfavorably reduced.

The perpendicular magnetic film may be made of a Co-alloy containing, as an alloying element, at least one element selected from Cr, Ta, Pt, Pd, Si, V, Nb, W, Mo, Hf, Re, Zr, B, P, Ru and the like. In this example, two perpendicular magnetic layers having different compositions are stacked with each other. In the lower perpendicular magnetic layer 14, the total amount of nonmagnetic elements added to Co is larger than in the upper perpendicular magnetic layer 15, so thait the lower perpendicular magnetic layer 14 functions to adjust the magnetic anisotropic energy Ku to a small value and precipitate the nonmagnetic elements in a larger amount in the crystal boundary.

The upper perpendicular magnetic layer 15 is formed in such a manner that hetero-epitaxy relationship relative to the lower perpendicularmagnetic layer 14 is maintained. Crystallographicically, continuous crystal growth is realized from the second underlayer 13 to the surface of the upper perpendicular magnetic layer 15.

These magnetic films are polycrystal films. In order that these films have a high linear recording density property and a low noise property, they have the average grain size of 15 nm or less and a structure wherein nonmagnetic elements are preferentially segregated in the crystal grain boundary of in particular the lower perpendicular magnetic layer 14.

Since this perpendicular magnetic layer 14 has on its crystal grain boundary a segregation layer in the longitudinal direction, magnetic interaction is small. In order to reduce medium noises, the upper perpendicular magnetic layer 15 having a relatively large magnetic anisotropic energy Ku is formed on this perpendicular magnetic layer 14, as described above. A protective film 16 is formed on the upper perpendicular magnetic layer 15.

Figure 2:
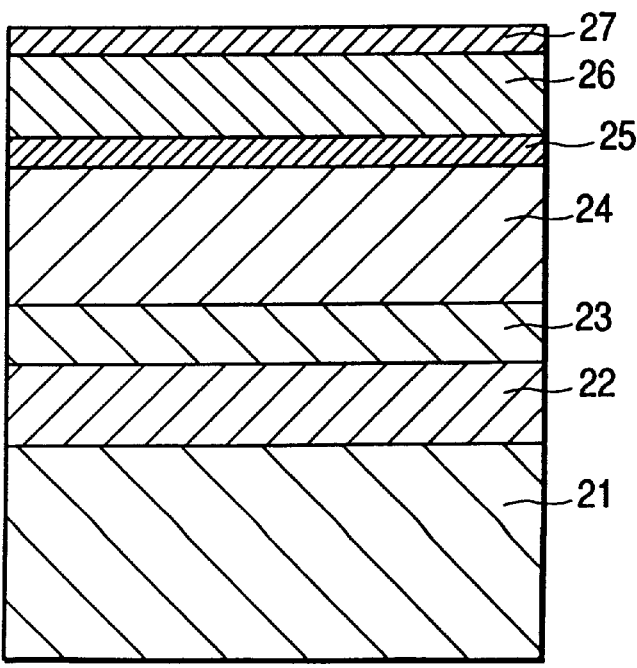
FIG. 2 is a view illustrating another example according to the present invention, and is a schematic sectional view of main elements of a recording medium wherein an interlayer is formed between an upper perpendicular magnetic layer and a lower perpendicular magnetic layer.
Figure 3:
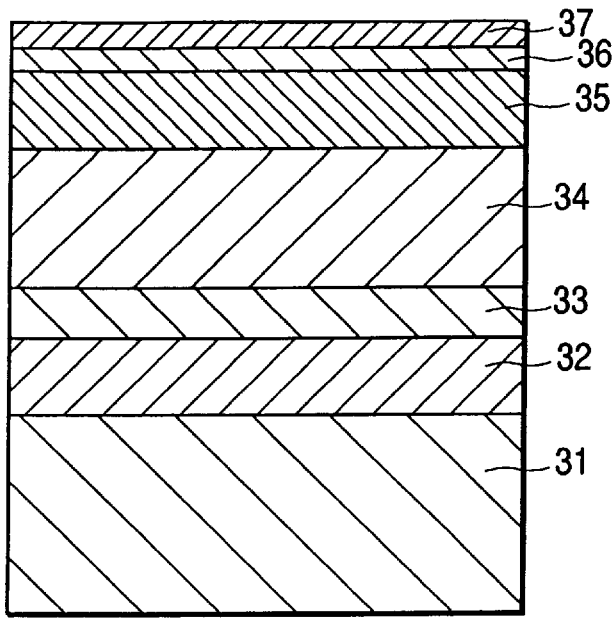
FIG. 3 is a view illustrating still another example according to the present invention, and is a schematic sectional view of main elements of a recording medium wherein a metal layer is formed on the upper perpendicular magnetic layer shown in FIG. 1.
Figure 4:
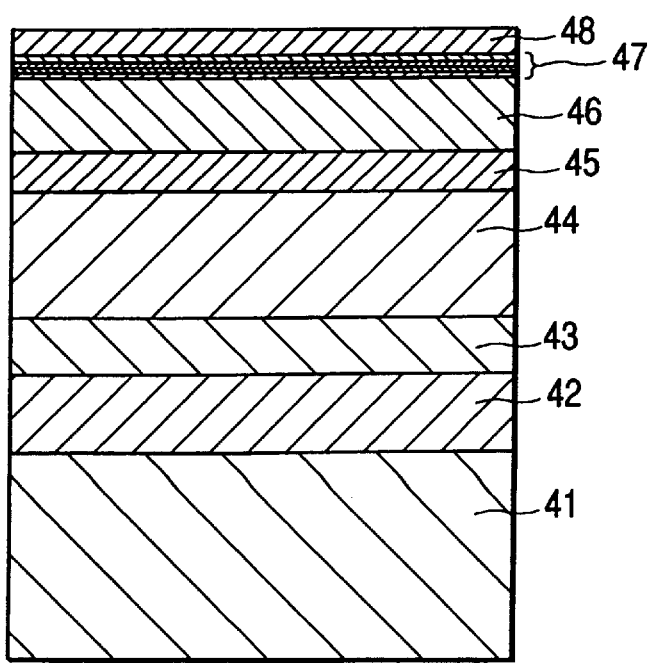
FIG. 4 is a view illustrating other example according to the present invention, and is a schematic sectional view of main elements of a recording medium wherein a metal layer is formed on the upper perpendicular magnetic layer shown in FIG. 2.

FIGS. 2–4 are schematic views of sections of other examples of perpendicular magnetic recording media according to the present invention.

A perpendicular magnetic recording medium of a second example, the sectional structure of which is shown in FIG. 2, is a medium wherein two underlayers composed of a first underlayer 22 and a second underlayer 23 are formed on a nonmagnetic substrate 21 and a magnetic film is formed thereon. This magnetic film is a film wherein a nonmagnetic interlayer 25 or a weakly magnetic interlayer 25 having a saturation magnetization Ms of 50 emu/cc or less, which has a thickness of 0.1–5 nm, is disposed between two stacked perpendicular magnetic layers of a lower perpendicular magnetic layer 24 and an upper perpendicular magnetic layer 26. This magnetic film has an advantage of reducing medium noises.

Crystallographicically, the interlayer 25 is hetero-epitaxially grown onto the upper and lower perpendicular magnetic film 24 and 26. The thickness of the interlayer 25 is desirably from 0.5 to 5 nm, and more desirably from 1 to 3 nm. Such a structure makes it possible to control the crystal grain size and the orientation of the perpendicular magnetic film highly, so that a lower noise property can be realized.

A protective film 27 is formed on the surface of the upper perpendicular magnetic film 26. As materials of the upper underlayer 22, the second underlayer 23, the lower perpendicular magnetic film 24 and the upper perpendicular magnetic film 26 and the like, the same as materials of the corresponding elements of the medium structure of the first example illustrated in FIG. 1 are used.

The medium structure of a third example according to the present invention, which is illustrated in FIG. 3, corresponds to a structure in which a metal film 36 is deposited on the magnetic film (the upper perpendicular magnetic film 15) of the perpendicular magnetic recording medium of the first example illustrated in FIG. 1. That is, in this medium structure, two underlayers composed of a first underlayer 32 and a second underlayer 33 are formed on a nonmagnetic substrate 31, and further bilayer perpendicular magnetic film composed of lower and upper perpendicular magnetic layers 34 and 35 is formed thereon. A metal film 36 is formed on the upper perpendicular magnetic film 35 and a protective film 37 is formed thereon.

As the material of the underlayers and the perpendicular magnetic film, the same materials as described concerning the first example can be used. As the metal film 36, the following can be used: a simple metal of Pt, Pd, Ir, Re, Ru or Hf; an alloy made mainly of any one(s) of these metal elements; stack films of a Co film or a Co-alloy film, and a film of a simple metal of any one(s) of these metal or an alloy film made mainly of any one(s) of these metal elements; or an amorphous magnetic material film containing a rare-earth element.

The medium structure of a fourth example according to the present invention, which is illustrated in FIG. 4, corresponds to a structure in which a metal film 47 is deposited on the magnetic film (the upper perpendicular magnetic film 26) of the perpendicular magnetic recording medium of the second example illustrated in FIG. 2. A nonmagnetic substrate 41, a first underlayer 42, a second underlayer 43, a lower perpendicular magnetic layer 44, an interlayer 45, an upper perpendicular magnetic layer 20 46, and a protective film 48 correspond to the nonmagnetic substrate 21, the first underlayer 22, the second underlayer 23, the lower perpendicular magnetic layer 24, the interlayer 25, the upper perpendicular magnetic layer 26, and the protective film 27, respectively.

As a metal film 47, the following can be used: a simple metal of Pt, Pd, Ir, Re, Ru or Hf; an alloy made mainly of any one(s) of these metal elements; stack films of a Co film or a Co-alloy film, and a film of a simple metal of any one(s) of these metal or an alloy film made mainly of any one(s) of these metal elements; or an amorphous magnetic material film containing a rare-earth element.

The medium structures illustrated in FIGS. 1–4 make it possible to reduce long and short range, magnetization fluctuations present in the surface of the perpendicular magnetic film and make the pitch of the microscopic magnetic fluctuations shorter than the recording bit length, resulting in a reduction in medium noises.

According to the present invention, noises of the perpendicular magnetic recording medium can be reduced to obtain a high S/N ratio. Thus, it becomes possible to obtain a high-density magnetic disk apparatus, and in particular attain high-density magnetic recording which can realize a recording density of 10 Gb/in.$^2$ or more. As a result, it becomes easy to make the apparatus compact and make its capacity large.

The following will more specifically describe the present invention. Examples 1–5 are examples concerned with the invention which can attain the first object, and Examples 6–10 are examples concerned with the invention which can attain the second object.

EXAMPLE 1

A glass substrate of 2.5 in. diameter was used to deposit thin films necessary for a recording medium sequentially on this substrate by a film depositing method according to DC magnetron sputtering. Thus, a magnetic recording medium having the sectional structure shown in FIG. 1 was produced.

Namely, the first underlayer 12, the second underlayer 13, the lower perpendicular magnetic layer 14, the upper perpendicular magnetic layer 15 and the protective film 16 were formed in this order on the substrate 11.

The conditions for depositing the respective films by the sputtering were as follows.

Concerning targets used in the sputtering, a Ti—10.2 atomic % Cr target, a Co—34 atomic % Cr target, a Co—17 atomic % Cr—5 atomic % Ta target, Co—10 atomic % Cr—10 atomic % Pt target, and a carbon target were used to form the first underlayer 12, the second underlayer 13, the lower perpendicular magnetic layer 14, the upper perpendicular magnetic layer 15 and the protective film 16, respectively.

Under the conditions of a sputtering Ar gas pressure of 3 mTorr, a sputtering power of 10 W/cm$^2$ and a substrate temperature of 250° C., the following were deposited: a CrTi film, as the first underlayer 12, of 30 nm thickness; a CoCr film, as the second underlayer 13, of 30 nm thickness; the lower perpendicular magnetic layer 14 of 30 nm thickness; the upper perpendicular magnetic layer 15 of 2 nm thickness; and a carbon film, as the protective film 16, of 10 nm thickness.

Samples of perpendicular magnetic media were produced under the same film depositing conditions as above except that the thickness of the upper perpendicular magnetic layer 15 was set to 5 nm, 10 nm, 15 nm, 20 nm, 30 nm or 40 nm.

As comparative samples, perpendicular magnetic media were produced in one of which the upper perpendicular magnetic layer 15 was not formed and in the other of which the thickness of the upper perpendicular magnetic layer 15 was set to 50 nm.

The magnetic properties of the upper and lower perpendicular magnetic layers 15 and 14 were measured, and then the following results were obtained. Concerning the lower perpendicular magnetic layer 14, Ms=385 emu/cc and Ku=1.8×10$^6$ erg/cc, and concerning the upper perpendicular magnetic layer 15, Ms=675 emu/cc and Ku=4.1×10$^6$ erg/cc.

The saturation magnetization Ms of the second underlayer 13 was 12 emu/cc.

Analysis using an electron microscope proved that the crystal grain sizes of these perpendicular magnetic layers were from 8 to 14 nm and Cr having an average width of 1 nm was segregated in an amount of 26–28 atomic % between the crystal grains.

The difference between the lattice constant of the second underlayer 13 and that of the lower perpendicular magnetic layer 14 was 3.2 %.

A dual element magnetic head was used to evaluate the read/write characteristics of these magnetic recording media. The gap length of the recording head was 0.2 μm, the shield gap of the magneto-resistive reading head was 0.2 μm and the spacing at the time of the measurement was 0.06 μm. The recording performance of the media was evaluated by measuring a recording density ($D_{50}$) at which the signal output decreases by a half of the signal output at a low recording density. The S/N ratio when magnetic recording was conducted at 20 kFCI was evaluated as a value relative to the S/N ratio of the comparative sample which did not have the upper perpendicular magnetic layer 15. These results are shown Table 1.

TABLE 1

|  | Comparative example | | The present invention | | | | | | |
|---|---|---|---|---|---|---|---|---|---|
| Lower perpendicular magnetic layer | 30 nm | 30 nm | 30 nm | 30 nm | 30 nm | 30 nm | 30 nm | 30 nm | 30 nm |
| Upper perpendicular magnetic layer | None | 50 nm | 2 nm | 5 nm | 10 nm | 15 nm | 20 nm | 30 nm | 40 nm |
| $D_{50}$ (kFCI) | 155 | 186 | 265 | 250 | 248 | 240 | 236 | 225 | 220 |
| S/N (relative value) | 1 | 1.22 | 2.53 | 2.22 | 2.41 | 2.56 | 2.43 | 2.31 | 2.10 |

The magnetic media of the present example had a greatly improved $D_{50}$ and an improved S/N ratio as compared with the comparative examples. Thus, it was understood that the former media were preferable as high-density magnetic recording media. The magnetic media produced in the present example were used to produce a 2.5 in. magnetic recording/reading device using an MR head as a reading element. Under the condition that its areal recording density was 10 Gb/in.$^2$, an error rate of $10^{-9}$ was able to be obtained. Thus, it was ascertained that this device was operated as a ultra-high-density recording/reading device.

EXAMPLE 2

A silicon substrate of 2.5 in. diameter was used to produce a perpendicular magnetic recording medium having a sectional structure illustrated in FIG. 2 by DC magnetron sputtering. The first underlayer 22, the second underlayer 23, the lower perpendicular magnetic layer 24, the interlayer 25, the upper perpendicular magnetic layer 26 and the protective film 27 were formed in this order on the substrate 21.

Concerning targets used in the sputtering, a Ge target, a Co—35 atomic % Ru target, a Co—15 atomic % Cr—6 atomic % Pt—3 atomic % Y target, a Co—45 atomic % Ru target, a Co—14 atomic % Cr—8 atomic % Pt target, and a carbon target were used to form the first underlayer 22, the second underlayer 23, the lower perpendicular magnetic layer 24, the interlayer 25, the upper perpendicular magnetic layer 26 and the protective film 27, respectively.

The saturation magnetization of the Co—35 atomic % Ru layer as the second underlayer 23 was not more than 15 emu/cc. Thus, a weakly magnetic film was obtained.

Under the conditions of a sputtering Ar gas pressure of 3 mTorr, a sputtering power of 10 W/cm$^2$ and a substrate temperature of 280° C., the following were deposited: A Ge film, as the first underlayer 22, of 30 nm thickness; a Co—Ru film, as the second underlayer 23, of 15 nm thickness; the lower perpendicular magnetic layer 24 of 30 nm thickness; the interlayer 25 of 0.1 nm thickness; Co—Cr—Pt film, as the upper perpendicular magnetic layer 26, of 2 nm thickness; and a carbon film, as the protective film 27, of 10 nm thickness. Thus, a perpendicular magnetic recording medium was produced which had a sectional structure illustrated in FIG. 2.

Samples of perpendicular magnetic media were produced under the same film depositing conditions as above except that the thickness of the interlayer 25 was set to 1 nm, 2 nm, 3 nm, or 5 nm.

As a comparative sample, a monolayer perpendicular magnetic medium was produced which had no lower perpendicular magnetic layer 24 and but had a Co—Cr—Pt film of 35 nm, which was used for the forming of the upper perpendicular magnetic layer 26. The conditions for forming the underlayers and the protective film of this comparative example were the same as in the example.

The magnetic properties of the upper and lower perpendicular magnetic layers 26 and 24 were measured, and then the following results were obtained. Concerning the lower perpendicular magnetic layer 24, Ms=370 emu/cc and Ku=2.0×10$^6$ erg/cc, and concerning the upper perpendicular magnetic layer 26, Ms=600 emu/cc and Ku=4.3×10$^6$ erg/cc. The saturation magnetization Ms of the interlayer 25 was 0 emu/cc.

Analysis using an electron microscope proved that the average grain size of crystal grains, measured in the surface of the upper perpendicular magnetic layer 26, was 11 nm and that Cr atoms were segregated in an amount of 27 atomic % in the crystal grain boundary of the lower perpendicular magnetic layer 24 with an average width of 1.2 nm.

The difference between the lattice constant of the second underlayer 23 and that of the lower perpendicular magnetic layer 24 was 3%.

A vibrating sample magneto-meter (VSM) and a dual element magnetic head were used to evaluate the coercive force Hc and the read/write characteristics of these magnetic recording media. The gap length of the recording head was 0.2 μm, the shield gap of the giant magneto-resistive (GMR) reading head was 0.15 μm and the spacing at the time of the measurement was 0.04 μm.

The recording performance of the media was evaluated by measuring a recording density ($D_{50}$) at which the signal output decreased by a half of the signal output at a low recording density. The S/N ratio when magnetic recording was conducted at 20 kFCI was evaluated as a value relative to the S/N ratio of the comparative sample. These results are shown in Table 2.

TABLE 2

|  | Comparative example | The present invention | | | | |
|---|---|---|---|---|---|---|
| Lower perpendicular magnetic layer | None | 30 nm | 30 nm | 30 nm | 30 nm | 30 nm |
| Interlayer | None | 0.1 nm | 1 nm | 2 nm | 3 nm | 5 nm |
| Upper perpendicular magnetic layer | 35 nm | 2 nm | 2 nm | 2 nm | 2 nm | 2 nm |
| HC (kOe) | 2.8 | 2.7 | 2.4 | 2.5 | 2.4 | 2.3 |
| $D_{50}$ (kFCl) | 185 | 268 | 250 | 245 | 220 | 215 |
| S/N (relative value) | 1 | 2.8 | 2.1 | 2.0 | 1.75 | 1.2 |

The magnetic recording media of the present example had greatly improved $D_{50}$ and S/N ratio as compared with the comparative examples. Thus, it was understood that the former media were preferable as high-density magnetic recording media. The magnetic media produced in the present example were used to produce a 2.5 in. magnetic recording/reading device using a GMR head as a reading element. Under that condition that its areal recording density was 20 Gb/in.$^2$, an error rate of $10^{-9}$ was able to be obtained. Thus, it was ascertained that this device was operated as a ultra-high-density recording/reading device.

EXAMPLE 3

A glass substrate of 2.5 in. diameter was used to produce a perpendicular magnetic recording medium having a sectional structure illustrated in FIG. 3 by DC magnetron sputtering. The first underlayer 32, the second underlayer 33, the lower perpendicular magnetic layer 34, the upper perpendicular magnetic layer 35, the metal film 36 and the protective film 37 were formed in this order on the substrate 31.

Targets used in the sputtering were as follows. A Ti target, a Co—30 atomic % Cr—10 atomic % Ru target, a Co—17 atomic % Cr—1 atomic % Y—3 atomic % Ta target, a Co—18 atomic % Cr—10 atomic % Pt target, a Pt target, and a carbon target were used for the first underlayer 32, the second underlayer 33, the lower perpendicular magnetic layer 34, the upper perpendicular magnetic layer 35, the metal film 36 and the protective film 37, respectively.

Under the conditions of a sputtering Ar gas pressure of 3 mTorr, a sputtering power of 10 W/cm$^2$ and a substrate temperature of 250° C., the following were deposited: a Ti film, as the first underlayer 32, of 30 nm thickness; a Co—Cr—Ru film, as the second underlayer 33, of 20 nm thickness; a Co—Cr—Y—Ta film, as the lower perpendicular magnetic layer 34, of 20 nm thickness; a Co—Cr—Pt film, as the upper perpendicular magnetic layer 35, of 1 nm thickness; a Pt film, as the metal film 36, of 0.5 nm thickness; and a carbon film, as the protective film 37, of 7 nm thickness.

Perpendicular magnetic media were produced in the same manner as above except that a Pd film (1 nm), an Ir film (1.5 nm), a Re film (0.1 nm), a Ru film (1.2 nm) and a Co/Pt multilayer film (3 nm) were formed, respectively, as the metal film 36 instead of the Pt film. This Co/Pt multilayer film was formed in such a manner that its total thickness would be 3 nm by repeating the cycle that a Co target and a Pt target were alternately used to form layers, each thickness of which was 0.5 nm, 6 times.

As comparative samples, the same perpendicular magnetic media as in the example were produced except that the upper perpendicular magnetic layer 35 and the metal film 36 were omitted.

The magnetic properties of the upper and lower perpendicular magnetic layers 35 and 34 were measured, and then the following results were obtained. Concerning the lower perpendicular magnetic layer 34, Ms=340 emu/cc and Ku=$1.5 \times 10^6$ erg/cc, and concerning the upper perpendicular magnetic layer 35, Ms=420 emu/cc and Ku=$3.0 \times 10^6$ erg/cc.

Analysis using an electron microscope proved that the average grain size of crystal grains, measured in the surface of the upper perpendicular magnetic layer 35, was 12 nm and that Cr atoms were segregated in an amount of 26–30 atomic % in the crystal grain boundary of the lower perpendicular magnetic layer 34 with an average width of 1 nm.

The difference between the lattice constant of the second underlayer 33 and that of the lower perpendicular magnetic layer 34 was 4%.

The read/write characteristics of these magnetic recording media were measured in the same manner as in Example 2. The results are shown in Table 3.

TABLE 3

| | Comparative example | | The present invention | | | | | |
|---|---|---|---|---|---|---|---|---|
| Lower perpendicular magnetic layer | 20 nm | 20 nm | 20 nm | 20 nm | 20 nm | 20 nm | 20 nm | 20 nm |
| Upper perpendicular magnetic layer | None | 1 nm | 1 nm | 1 nm | 1 nm | 1 nm | 1 nm | 1 nm |
| Metal film | None | None | Pt 0.5 nm | Pd 1 nm | Ir 1.5 nm | Re 0.1 nm | Ru 1.2 nm | Co/Pt 3 nm |
| Hc (kOe) | 2.3 | 2.5 | 2.5 | 2.5 | 2.4 | 2.5 | 2.4 | 2.9 |
| $D_{50}$ (kFCl) | 190 | 220 | 235 | 240 | 243 | 251 | 240 | 265 |
| S/N (relative value) | 1 | 1.2 | 2.1 | 2.2 | 2.0 | 2.3 | 2.4 | 2.2 |
| Error rate | $1 \times 10^{-6}$ | $3 \times 10^{-6}$ | $1 \times 10^{-9}$ | $3 \times 10^{-10}$ | $5 \times 10^{-10}$ | $1 \times 10^{-9}$ | $8 \times 10^{-10}$ | $6 \times 10^{-10}$ |

The magnetic recording media of the present example had greatly improved Dso and S/N ratio as compared with the comparative examples. Thus, it was understood that the former media were more preferable as high-density magnetic recording media. The magnetic media produced in the present example were used to produce a 2.5 in. magnetic recording/reading device using, as a reading element, a high-sensitivity reading head using a magneto-resistive head applying magnetic tunneling effect. Under that condition that its areal recording density was 30 Gb/in.$^2$, an error rate of $10^{-9}$ was able to be obtained as shown in Table 3. Thus, it was ascertained that this device was operated as a ultra-high-density recording/reading device.

EXAMPLE 4

Perpendicular magnetic recording medium having a sectional structure illustrated in FIG. 4 was produced in the same manner as in Example 2 except that a multilayer metal film 47 of (Co—10 atomic % Cr—3 atomic % Ta)/(Pt—45 atomic % Re), which had a thickness of 5 nm, was deposited on the upper perpendicular magnetic recording layer in the perpendicular magnetic recording medium produced in Example 2.

Namely, the first underlayer 42, the second underlayer 43, the lower perpendicular magnetic layer 44, the interlayer 45, the upper perpendicular magnetic layer 46, the multilayer metal film 47 and the protective film 48 were formed sequentially on the substrate 41.

The (Co—10 atomic % Cr—3 atomic % Ta)/(Pt—45 atomic % Re) multilayer metal film 47 was formed in such a manner that its total thickness would be 5 nm by repeating the cycle that a Co—Cr—Ta target and a Pt—Re target were alternately used to form layers, each thickness of which was 0.25 nm, 10 times.

As a comparative example, a perpendicular magnetic recording medium was produced in which the metal film 47, the lower perpendicular magnetic layer 44 and the interlayer 45 were not formed. Their characteristics were measured under the same recording/reading conditions as in Example 2. The results are shown in FIG. 4.

TABLE 4

| | Comparative example | The present invention | | | | |
|---|---|---|---|---|---|---|
| Lower perpendicular magnetic layer | None | 30 nm | 30 nm | 30 nm | 30 nm | 30 nm |
| Interlayer | None | 0.1 nm | 1 nm | 2 nm | 3 nm | 5 nm |
| Upper perpendicular magnetic layer | 35 nm | 2 nm | 2 nm | 2 nm | 2 nm | 2 nm |
| Metal film | None | 5 nm | 5 nm | 5 nm | 5 nm | 5 nm |
| Hc (kOe) | 2.8 | 3.1 | 2.9 | 2.7 | 2.4 | 2.3 |
| $D_{50}$ (kFCl) | 185 | 270 | 263 | 230 | 220 | 228 |
| S/N (relative value) | 1 | 3.2 | 2.6 | 2.4 | 2.5 | 1.9 |
| Error rate | $8 \times 10^{-5}$ | $1 \times 10^{-9}$ | $1 \times 10^{-9}$ | $9 \times 10^{-10}$ | $8 \times 10^{-10}$ | $1 \times 10^{-9}$ |

The magnetic recording media of the present examples had greatly improved $D_{50}$ and S/N ratio as compared with the comparative example. Thus, it was understood that the former media were more preferable as high-density magnetic recording media. Under that condition that its areal recording density was 20 Gb/in.$^2$, an error rate of $10^{-9}$ was able to be obtained as shown in Table 4. Thus, it was ascertained that this device was operated as a ultra-high-density recording/reading device.

EXAMPLE 5

The perpendicular magnetic recording media produced in Example 3 and a dual element head having a high-sensitivity reading element using a giant magneto-resistance (GMR) were used to make a magnetic storage apparatus.

Figure 5A:
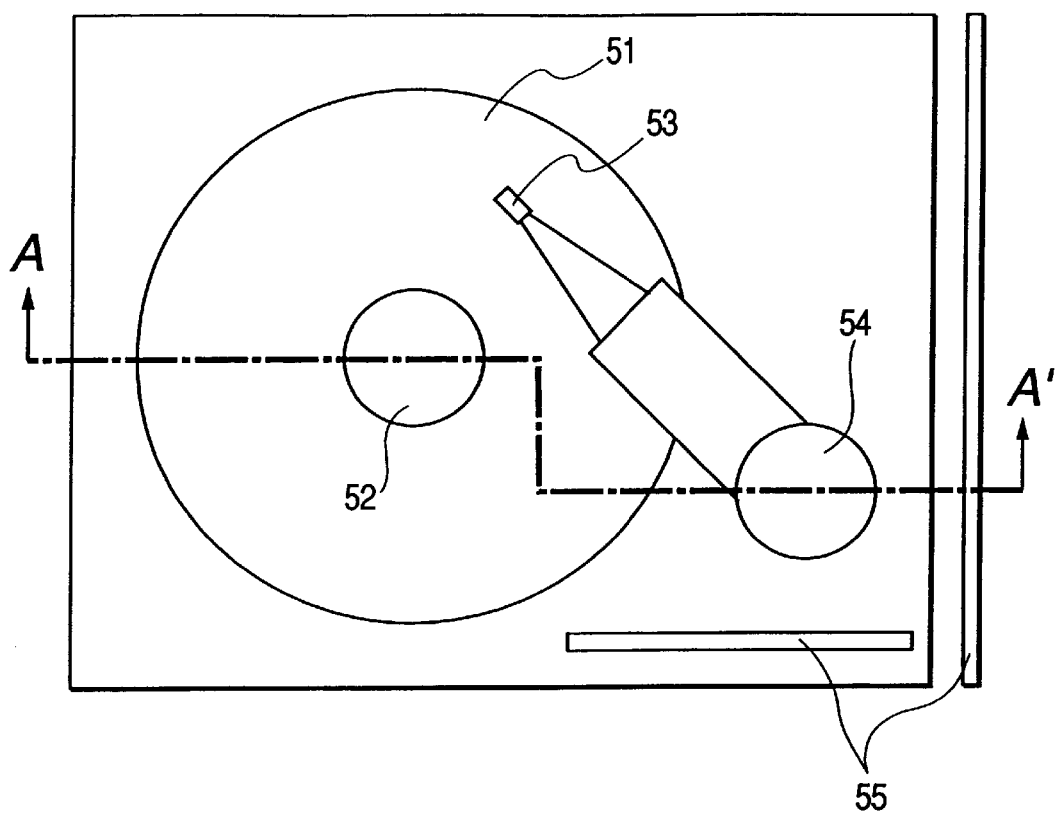
FIG. 5A is a plane view of a structure of a magnetic storage apparatus.
Figure 5B:
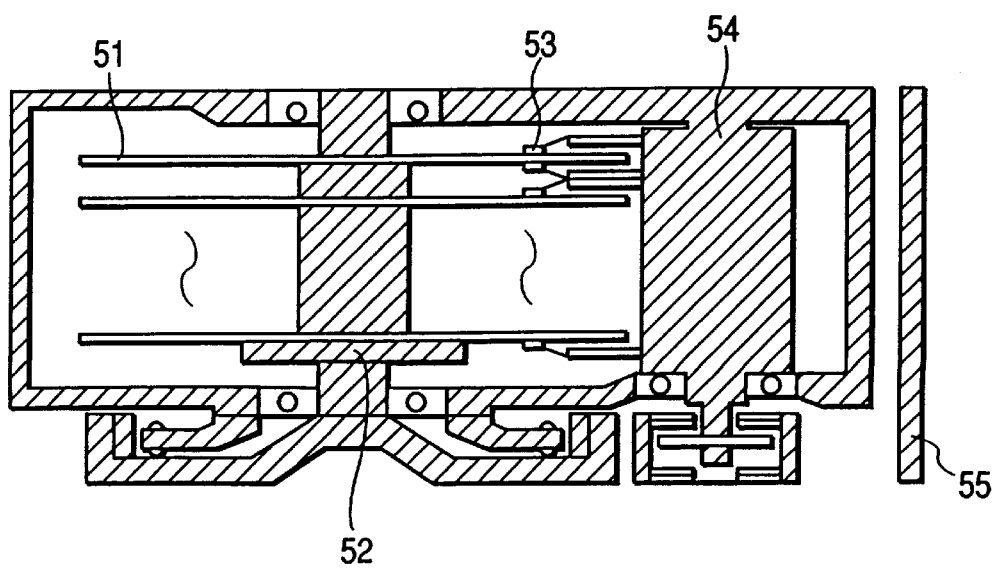
FIG. 5B is a sectional view thereof.

As illustrated in FIG. 5A, which is a schematic plane view, and FIG. 5B, which is a cross section along an AA line in FIG. 5A, this magnetic storage apparatus is an apparatus having a well known structure, which has a magnetic recording medium 51 which is rotated and driven by a magnetic recording medium driving unit 52, a magnetic head 53 which is held by a magnetic head driving unit 54 and records data on the magnetic recording medium 51 and reads data therefrom, and a recording/reading signal processing unit 55 for processing recording data and reading data from the magnetic head 53.

The track width of the recording head was set to 0.4 µm, the track width of the GMR head element for reading was set to 0.32 µm, and the spacing between the head and the medium was set to 15 µm. As a signal processing, the PR5 method was adopted. When the apparatus was operated under the condition of an areal recording density of 30 Gb/in.$^2$, excellent read/write characteristics of error rates of $10^{-9}$ or less were obtained in all of the perpendicular magnetic recording media.

EXAMPLE 6

A sputtering method was used to form a Ti—10 atomic % Cr alloy film (the first underlayer) of 30 nm thickness on a disk substrate made of Al—Mg alloy to which a nickel(Ni) and phosphorus (P) alloy plating film was applied. Thereafter, the second underlayer was formed which was composed of a nonmagnetic Co—Cr alloy film having a composition of Co—35 atomic % Cr and a thickness of 0.02 µm. The underlayers composed of these two layers were made at a substrate temperature of 200° C.

Thereafter, a quadruple alloy of Co—19 atomic % Cr—10 atomic % Pt—2 atomic % Ta and of 30 nm thickness was formed as a perpendicular magnetic recording film.

Furthermore, a magnetic film of Co—18 atomic % Sm and of 2 nm thickness was formed thereon at a substrate temperature of 300° C. in order to prohibit generation of reversed domains in the surface layer.

At last, a carbon film of 15 nm thickness was formed as a protective film. The sample produced in this manner was referred to as disk S1.

A sample was produced under the same condition as for the disk S1 except that the thickness of Co—Sm alloy for prohibiting reversed domains in the surface layer of the perpendicular magnetic recording film was set to 1 nm. This disk was referred to as disk S2.

As a comparative example, a sample having the same structure as disk Si except that the Co—Sm film was not formed was produced under the same condition. This sample was referred to as disk R1.

It was ascertained with an X-ray diffractometer that in the perpendicular magnetic recording films (Co—19 atomic % Cr—10 atomic % Pt—2 atomic % Ta) of the disks S1, S2 and R1 produced in the manners all of their crystal structures had a hexagonal close packed structure and their c axis was oriented perpendicularly to their film surface.

The magnetic characteristics of the samples produced in this way were measured with a vibrating sample magnetometer (VSM) to obtain their saturation magnetization (Ms) and coercive force (Hc). The direction along which the magnetic field was applied was set to the direction perpendicular to the film plane. The results are shown as magnetization curves in FIG. 6, and are together shown in Table 5.

Figure 6:
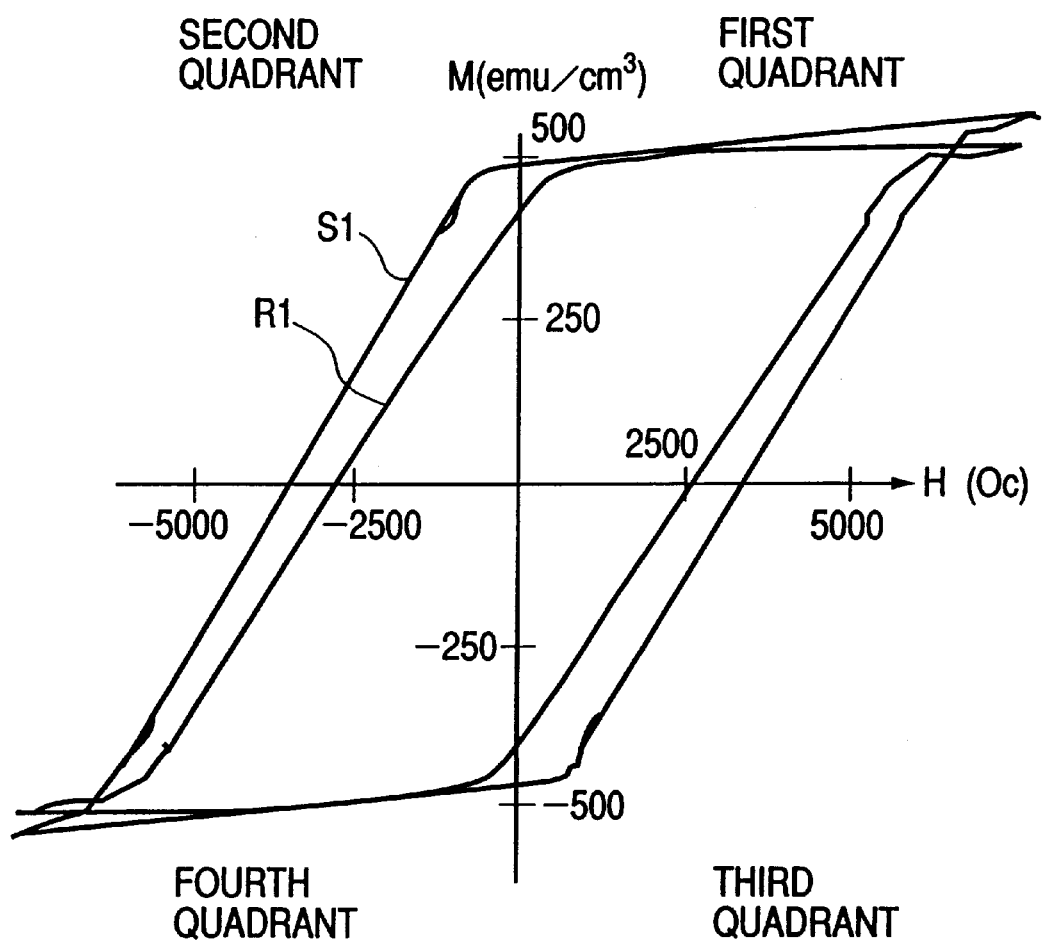
FIG. 6 shows magnetization curves of a sample of the present invention wherein a longitudinal easy magnetization film is deposited on the surface of a perpendicular magnetic recording medium and a comparative sample.

As is evident from FIG. 6, in the disk S1 as the intensity of the magnetic field decreased, the magnetization decreased slowly due to the reduced magnetization of the surface layer with in-plane axis of easy magnetization. However, even if the magnetic field direction was reversed, this tendency did not change up to about 400 Oe.

When the intensity of the reversed magnetic field reached 400 Oe, the magnetization curve became a shoulder-like form. When the intensity of the magnetic field became more than 400 Oe, irreversible magnetization reversal occurred so that the magnetization was suddenly reduced. In other words, in the disk S1, reversed domains were generated at about 400 Oe in the perpendicular magnetic film.

On the other hand, in the comparative disk R1 the shoulder-like portions of the magnetization curve were present in the first and fourth quadrants. Thus, irreversible magnetization reversal started just before the magnetic field direction was reversed. As described above, a great difference was observed in the intensities of the magnetic fields at the position of the should-like portions between the disk S1 of the present invention and the disk R1 of the comparative example.

The magnetization curve of the disk S2 having the Co—Sm film of 1 nm thickness for prohibiting the generation of reversed domains in the surface layer of the perpendicular magnetic recording film had substantially the same form as that of the disk S1. Thus, it was ascertained that same effect was obtained in the case that the thickness of the Co—Sm film was a small value of 1 nm, as well.

The film formed to prohibit the reversed domains in the surface layer of the perpendicular magnetic recording film is an in-plane easy magnetization film. For this reason, when perpendicular magnetic recording is conducted, some trouble may happen. Therefore, it is desired that the thickness of the film deposited on the surface is made as thin as possible.

Next, a magnetic recording/reading tester was used to evaluate the read/write characteristics of these disks S1, S2 and R1. A magnetic head used in the recording and reading was a thin film head wherein its gap length was 0.2 µm, its track width was 4.5 µm and its coil-turned number was 30.

Reproduced output and medium noises were measured in the case that "all 1", signals were recorded under the conditions that the spacing between the air-bearing face of the head and the surface of the medium, that is, the floating height, was 0.04 µm, the circumferential speed was 10 m/s and the linear recording density was 200 kFCI. After recording was conducted on the disks at 200 kFCI and then the disks were allowed to be left without any operation stand. Thus, the change in reproduced output was examined with the passage of time. The results are shown in Table 5.

As is evident from Table 5, when the reproduced outputs after 100 hours of the disks S1 and S2 according to the present example are compared with that of the comparative disk R1, it can be found that while the output of the disk R1 decreased by 8%, the outputs of the disks S1 and S2 decreased by 0.5% and 0.8%, respectively. Thus, the decrease in the outputs of the disks S1 and S2 can hardly be observed.

Concerning the reproduced output and the medium noises, the disks S1 and S2 were more excellent than the comparative disk R1. It can be therefore understood that the present invention has an advantage for improving read/write characteristics.

The above results demonstrate that as the magnetic field at which irreversible magnetization occurs, that is, the polarity of the shoulder-like portion in the magnetization curve is opposite to the direction of the magnetic field initially applied and the absolute value thereof is larger, the read/write characteristics for magnetic recording media are more excellent and stability against thermal fluctuation is higher.

The reason why such magnetic characteristics were obtained in the disks S1 and S2 is that the magnetic film whose anisotropic magnetic field is large and whose direction of easy magnetization is in-plane is formed as a film for prohibiting the generation of reversed domains on the surface of the perpendicular magnetic recording film.

It is presumed that even if this film for prohibiting the generation of reversed domains has a very small thickness of 1–2 nm, this film has a great effect for prohibiting nucleation sites which can cause irreversible magnetization reversal in the film surface, that is, the generation of reversed domains in the surface layer of the perpendicular magnetic recording film.

It is considered that these reversed domains mainly cause medium noises, and that the medium noises are also reduced as a result of difficulty in generating the reversed domains.

It is also considered that difficulty in causing the reversed domains similarly produces a good effect for improving thermal stability.

Since the thickness of the Co—Sm film as the film for prohibiting the reversed domains is a small value of 1–2 nm in the present example, the crystal structure and the in-plane coercive force of the Co—Sm film were not able to be identified. In order to examine the crystal structure and magnetic characteristics, a Co—35 atomic % Cr, which was an underlayer, was formed by sputtering, and then a Co—Sm film of 30 nm thickness was formed. As a result, it was ascertained that its crystal structure was amorphous and it was also ascertained from the measurement of its magnetic characteristics that this film had an in-plane axis of easy magnetization and its in-plane coercive force was about 800 Oe.

EXAMPLE 7

The following will describe an example in which an Fe—Nd—B magnetic film was formed on the surface of a perpendicular magnetic recording film. The method for producing a sample was the same as in Example 6. In the present example, however, a quadruple alloy of Co—19 atomic % Cr—10 atomic % Pt—2 atomic % Ta was formed as a perpendicular magnetic recording film and then a magnetic film (referred to as a surface magnetic film) having a composition of Fe—12 atomic % Nd—8 atomic % B and a thickness of 2 nm was formed as a magnetic film deposited on the surface of this perpendicular magnetic recording film at a substrate temperature of 350° C. Thereafter, a carbon protective film of 15 nm thickness was formed to produce a disk S3.

The magnetic characteristics and the read/write characteristics of the disk S3 are together shown in Table 5. As is evident from Table 5, in the disk S3 the value of its nucleation magnetization became negative and reversed domains were more difficult to be generated than the comparative disk R1. Following this, both of read/write characteristics and stability against thermal fluctuation were improved. These effects show that the Fe—Nd—B magnetic film also has an effect of prohibiting reversed domains, similarly to the Sm—Co magnetic film, but that this effect is smaller than that of the disks S1 and S2.

In order to examine the crystal structure and magnetic characteristics of the Fe—Nd—B film of this sample, an Fe—12 atomic % Nb—8 atomic % B film of 30 nm thickness was directly formed on the underlayer. As a result, it was ascertained that the Fe—Nd—B film had an in-plane axis of easy magnetization with crystal structure of amorphous and its in-plane coercive force was about 300 Oe.

EXAMPLE 8

The following will describe an example in which a magnetic film with an in-plane axis of easy magnetization was formed on the back face, that is, the substrate side of a perpendicular magnetic recording film (on the perpendicular magnetic recording medium surface facing to the substrate).

The method for producing the sample was the same as in Example 6. In the present example, however, a nonmagnetic Co—Cr film of Co—35 atomic % Cr was formed as the second underlayer and subsequently an in-plane easy magnetization film of 18 atomic % Sm and of 2 nm thickness was formed at a substrate temperature of 300° C.

Thereafter, a perpendicular magnetic film of Co—19 atomic % Cr—10 atomic % Pt—2 atomic % Ta of 30 nm thickness was formed as a magnetic recording film, and then a carbon film of 15 nm thickness was formed as a protective film thereon. In short, in the present example the in-plane axis of easy magnetization film was formed on the back surface of the perpendicular magnetic recording film.

The sample produced in this manner was referred to as disk S4. Its magnetization curve and read/write characteristics were measured in the same manner in Example 6. The results are shown in Table 5. As is evident from Table 5, in the disk S4 its nucleation field exhibited a large value of −415 Oe, similarly to the disks S1 and S2, and reversed domains were not easily generated. The read/write characteristics and the reduction in output after 100 hours of the disk S4 were also more excellent than the comparative disk R1.

EXAMPLE 9

A sample was produced wherein in-plane easy magnetization films were formed on the front surface and the back surface of a perpendicular magnetic recording film. The method for producing the sample of the present example was a combination of those in Examples 6 and 8. Its film structure was a structure wherein in-plane easy magnetization films of Co—18 atomic % Sm and of 2 nm thickness were formed on the back surface and the front surface of a perpendicular magnetic film of Co—19 atomic % Cr—10 atomic % Pt—2 atomic % Ta.

This disk was referred to as disk S5. Its magnetic characteristics and read/write characteristics were measured in the same manner as in Example 6. The results are shown in Table 5. As is evident from Table 5, by depositing the in-plane easy magnetization films on the front and back surfaces of the perpendicular magnetic film, its nucleation magnetization became a larger value of—520 Oe than the media wherein the in-plane easy magnetization films film was formed only on their single surface. The read/write characteristics and the reduction in output after 100 hours of the disk S5 were also further improved.

TABLE 5

| | (No. 1) | | |
| --- | --- | --- | --- |
| | Magnetic properties | | |
| Disk | Coercive force (Oe) | Rectangularity Ratio | Nucleation magnetization* (Oe) |
| S1 | 2730 | 0.90 | −430 |
| S2 | 2690 | 0.87 | −370 |

TABLE 5-continued

| | | | |
|---|---|---|---|
| S3 | 2530 | 0.90 | −123 |
| S4 | 2720 | 0.92 | −415 |
| S5 | 2750 | 0.85 | −520 |
| R1 | 2540 | 0.85 | +115 |

(No. 2)

| Disk | Read/write characteristics** | | | |
|---|---|---|---|---|
| | Relative regenerative output (dB) | Relative medium noise (dB) | Relative S/N (dB) | Reduction in output after 100 hours (%) |
| S1 | +1.4 | −1.5 | +2.9 | 0.5 |
| S2 | +1.5 | −1.6 | +3.1 | 0.8 |
| S3 | +0.3 | −0.5 | +0.8 | 2.7 |
| S4 | +1.0 | −0.5 | +1.5 | 0.7 |
| S5 | +1.5 | −2.0 | +3.5 | 0.2 |
| R1 | 0 | 0 | 0 | 8.0 |

*Concerning the signs in Table 5, the direction of the magnetic field initially applied is set to "+". The nucleation magnetization means an intensity of the magnetization at which irreversible magnetization reversal starts to arise in the magnetization curves, that is, a magnetization at the position of the shoulder-like portion in the magnetization curve.
**The value of the comparative disk R1 was set to 0 dB.

EXAMPLE 10

FIG. 7 is a schematic view of an example of the magnetic disk device according to the present invention. In a head disk assembly 4, plural magnetic disks 1 are fitted onto a spindle axis, and are rotated at a high speed by a spindle 5.

As these disks 1, the disks produced in Examples 6–10 are used. Magnetic heads for recording/reading signals are arranged oppositely to the magnetic recording surfaces of the disks, and one of them functions as a servo head.

The magnetic heads 2 are transferred in the substantial radius direction of the magnetic disks 1 by an actuator 6 through a head stuck assembly 3.

Furthermore, the present device has a read/write channel 7 for reading/writing data, a signal processor 8 for processing the data, a head disk controller 9 for controlling these units and the driving units, an interface 10 for giving data to the device and taking data therefrom, and the like.

This magnetic disk device was used to read data on the magnetic disks produced in Examples 6–10, so that sufficiently high regenerative output and low medium noises were able to be obtained in all of the disks. Even if information was recorded on the disks and the disks were allowed to stand for not less than 100 hours, a reduction in the reproduced output was hardly observed and thermal stability was also excellent.

What is claimed is:

1. A perpendicular magnetic recording medium having a perpendicular magnetic film formed through an underlayer on a nonmagnetic substrate,
    the underlayer which includes a material having a hexagonal close packed structure or an amorphous structure, comprising:
    a first underlayer nearer to the substrate; and
    a second underlayer having a hexagonal (close packed structure formed on the first underlayer, a preferred growth of [0001] and a material capable of hetero-epitaxy growth onto the perpendicular magnetic film,
    wherein the perpendicular magnetic film formed on the second underlayer includes a lower perpendicular magnetic layer contacting the second underlayer and an upper perpendicular magnetic layer formed thereon, the perpendicular magnetic film including the lower and upper layers is a Co-alloy polycrystal film, the total concentration of added nonmagnetic elements in the upper perpendicular magnetic layer is lower than that in the lower perpendicular magnetic layer, the saturation magnetization Ms and the magnetic anisotropic energy Ku of the upper perpendicular magnetic layer are larger that those of the lower perpendicular magnetic layer, continues hetero-epitaxy growth from the second underlayer to the upper perpendicular magnetic layer is realized, the total thickness of the perpendicular magnetic film is from 5 to 70 nm, and the average grain size of crystal grains in the upper perpendicular magnetic layer is from 5 to 15 nm on the basis of measurement at the surface side of the upper perpendicular magnetic layer.

2. A perpendicular magnetic recording medium according to claim 1, wherein a nonmagnetic layer or a magnetic layer having a saturation magnetization Ms of 50 emu/cc or less is formed as an interlayer between the lower perpendicular magnetic layer and the upper perpendicular magnetic layer, and continuous hetero-epitaxy growth from the second underlayer to the upper perpendicular magnetic layer is made.

3. A perpendicular magnetic recording medium according to claim 1, wherein a metal film of 0.1–5 nm thickness is formed on the upper perpendicular magnetic layer and the metal film is any one metal film among a film of a simple metal selected from the element group comprising Pt, Pd, Ir, Re, Ru and Hf; an alloy film made mainly of any one of these metal elements; stack films of a Co film or a Co-alloy film, and a film of a simple metal selected from the element of these metal elements or an alloy film made mainly of any one of these metal elements; and an amorphous magnetic material film containing a rare-earth element.

4. A perpendicular magnetic recording medium according to claim 1, wherein the lower perpendicular magnetic layer is a polycrystal layer having a segregation phase containing a nonmagnetic element in an amount of 25 atomic % or more inside its crystal grain boundary.

5. A perpendicular magnetic recording medium according to claim 1, wherein the magnetic anisotropic energy of the lower perpendicular magnetic layer is from $1 \times 10^6$ to $2.5 \times 10^6$ erg/cc and the magnetic anisotropic energy of the upper perpendicular magnetic layer is from $2.5 \times 10^6$ to $5 \times 10^6$ erg/cc.

6. A perpendicular magnetic recording medium according to claim 1, wherein the difference between the lattice constant of the second underlayer and that of the lower perpendicular magnetic layer is 5% or less.

7. A perpendicular magnetic recording medium according to claim 1, wherein the thickness of the lower perpendicular magnetic layer is 2 or more times as large as that of the upper perpendicular magnetic layer.

8. A perpendicular magnetic recording medium having a perpendicular magnetic film formed through an underlayer on a nonmagnetic substrate,
    the underlayer which includes a material having a hexagonal close packed structure or an amorphous structure, comprising:
    a first underlayer nearer to the substrate; and
    a second underlayer having a hexagonal close packed structure formed on the first underlayer, a preferred growth orientation of [0001] and a material capable of hetero-epitaxy growth onto the perpendicular magnetic film, wherein the perpendicular magnetic film formed on the second underlayer includes a lower perpendicular magnetic layer contacting the second underlayer and an upper perpendicular magnetic layer formed thereon, the perpendicular magnetic film including the lower and upper layers is a Co-alloy polycrystal film, the total concentration of added nonmagnetic elements in the upper perpendicular magnetic layer is lower than that in the lower perpendicular magnetic layer, the saturation magnetization Ms and the magnetic anisotropic energy Ku of the upper perpendicular magnetic layer are larger that those of the lower perpendicular magnetic layer, continuos hetero-epitaxy growth from the second underlayer to the upper perpendicular magnetic layer is made, the total thickness of the perpendicular magnetic film is from 5 to 70 nm, and the average grain size of crystal grains in the upper perpendicular magnetic layer is from 5 to 15 nm on the basis of measurement at the surface side of the upper perpendicular magnetic layer; and a nonmagnetic layer or a magnetic layer having a saturation magnetization Ms of 50 emu/cc or less is formed as an interlayer between the lower perpendicular magnetic layer and the upper perpendicular magnetic layer, and continuous hetero-epitaxy growth from the second underlayer to the upper perpendicular magnetic layer is made.

9. A perpendicular magnetic recording medium according to claim 8, wherein a metal film of 0.1–5 nm thickness is formed on the upper perpendicular magnetic layer and the metal film is any one metal film among a film of a simple metal selected from the element group comprising Pt, Pd, Ir, Re, Ru and Hf; an alloy film made mainly of any one of these metal elements; stack films of a Co film or a Co-alloy film, and a film of a simple metal selected from the element of these metal elements or an alloy film made mainly of any one of these metal elements; and an amorphous magnetic material film containing a rare-earth element.

10. A perpendicular magnetic recording medium according to claim 8, wherein the lower perpendicular magnetic layer is a polycrystal layer having a segregation phase containing a nonmagnetic element in an amount of 25 atomic % or more inside its crystal grain boundary.

11. A perpendicular magnetic recording medium according to claim 8, wherein the magnetic anisotropic energy of the lower perpendicular magnetic layer is from $1 \times 10^6$ to $2.5 \times 10^6$ erg/cc and the magnetic anisotropic energy of the upper perpendicular magnetic layer is from $2.5 \times 10^6$ to $5 \times 10^6$ erg/cc.

12. A perpendicular magnetic recording medium according to claim 8, wherein the difference between the lattice constant of the second underlayer and that of the lower perpendicular magnetic layer is 5% or less.

13. A perpendicular magnetic recording medium according to claim 8, wherein the thickness of the lower perpendicular magnetic layer is 2 or more times as large as that of the upper perpendicular magnetic layer.

14. A perpendicular magnetic recording medium according to claim 8, wherein the thickness of the magnetic layer as the interlayer is from 0.1 to 5 nm.

15. A magnetic storage apparatus comprising:
a magnetic recording medium;
a spindle motor for rotating the magnetic recording medium;
a magnetic head having a recording element; and
a reading element, an actuator for positioning the magnetic head, and a means for processing reading/recording signals of the magnetic head,
wherein the perpendicular magnetic recording medium comprises a perpendicular magnetic film formed through an underlayer on a nonmagnetic substrate, the underlayer which includes a material having a hexagonal close packed structure or an amorphous structure, comprises: a first underlayer nearer to the substrate; and a second underlayer having a hexagonal close packed structure formed on the first underlayer, a preferred growth orientation of [0001] and a material capable of hetero-epitaxy growth onto the perpendicular magnetic film, the perpendicular magnetic film formed on the second underlayer includes a lower perpendicular magnetic layer contacting the second underlayer and an upper perpendicular magnetic layer formed thereon, the perpendicular magnetic film including the lower and upper layers is a Co-alloy polycrystal film, the total concentration of added nonmagnetic elements in the upper perpendicular magnetic layer is lower than that in the lower perpendicular magnetic layer, the saturation magnetization Ms and the magnetic anisotropic energy Ku of the upper perpendicular magnetic layer are larger that those of the lower perpendicular magnetic layer, continuos hetero-epitaxy growth from the second underlayer to the upper perpendicular magnetic layer is made, the total thickness of the perpendicular magnetic film is from 5 to 70 nm, and the average grain size of crystal grains in the upper perpendicular magnetic layer is from 5 to 15 nm on the basis of measurement at the surface side of the upper perpendicular magnetic layer.

16. A magnetic storage apparatus according to claim 15, wherein the reading element of the magnetic head comprises a megnetoresistive transducer or a giant magnetoresistive transducer, and has a function of performing magnetic recording/reading at an areal recording density of 10 Gb/in.$^2$ or more.

17. A magnetic storage apparatus according to claim 15, wherein the reading element of the magnetic head comprises a magneto-resistance detection type head using magnetic tunneling effect, and has a function of performing magnetic recording/reading at an areal recording density of 30 Gb/in.$^2$ or more.

18. A perpendicular magnetic recording medium comprising a magnetic recording film having the property of perpendicular easy magnetization and being formed through an underlayer on a nonmagnetic substrate,
wherein a magnetic film or magnetic films having the property of in-plane easy magnetization is/are formed on both surfaces or a single surface of the magnetic recording film.

19. A perpendicular magnetic recording medium according to claim 18, wherein the thickness of the magnetic film having the property of in-plane easy magnetization is 10 nm or less.

20. A perpendicular magnetic recording medium according to claim 18, wherein the magnetic film having the property of in-plane easy magnetization has a coercive force, measured along its longitudinal direction, of 100 Oe or more.

21. A perpendicular magnetic recording medium according to claim 18, wherein the magnetic film having the property of in-plane easy magnetization is a Sm—Co magnetic film, or an Fe—Nd—B magnetic film.

22. A magnetic storage apparatus comprising:
a magnetic recording medium;
an actuator for rotating and driving the magnetic recording medium;

a magnetic head for recording and reaching;

a means for moving the magnetic head relatively to the magnetic recording medium; and a means for reading output signals from the magnetic head, wherein the perpendicular magnetic recording medium has a magnetic recording film having the property of perpendicular easy magnetization and being formed through an underlayer on a nonmagnetic substrate, and a magnetic film or magnetic films having the property of in-plane easy magnetization is/are formed on both surfaces or a single surface of the magnetic recording film.

* * * * *